United States Patent
Limonov et al.

(10) Patent No.: US 8,817,020 B2
(45) Date of Patent: Aug. 26, 2014

(54) IMAGE PROCESSING APPARATUS AND IMAGE PROCESSING METHOD THEREOF

(71) Applicant: Samsung Electronics Co., Ltd., Suwon-si (KR)

(72) Inventors: Alexander Limonov, Suwon-si (KR); Jin-sung Lee, Suwon-si (KR); Jong-sul Min, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/059,962

(22) Filed: Oct. 22, 2013

(65) Prior Publication Data

US 2014/0055450 A1 Feb. 27, 2014

Related U.S. Application Data

(63) Continuation of application No. PCT/KR2012/007362, filed on Sep. 14, 2012.

(60) Provisional application No. 61/534,533, filed on Sep. 14, 2011.

(30) Foreign Application Priority Data

Aug. 21, 2012 (KR) .................. 10-2012-0091368

(51) Int. Cl.
*G06T 15/00* (2011.01)
*G06T 7/00* (2006.01)

(52) U.S. Cl.
CPC .................................. *G06T 7/0051* (2013.01)
USPC ........... 345/419; 345/420; 345/629; 382/154; 382/285

(58) Field of Classification Search
CPC ..................................................... G06T 7/0051
USPC .......... 345/419, 629, 630, 421, 422; 382/154, 382/285

See application file for complete search history.

(56) References Cited

U.S. PATENT DOCUMENTS

| | | | | |
|---|---|---|---|---|
| 6,661,914 B2 * | 12/2003 | Dufour | .......................... | 382/154 |
| 6,760,488 B1 * | 7/2004 | Moura et al. | .................. | 382/285 |
| 7,085,409 B2 * | 8/2006 | Sawhney et al. | .............. | 382/154 |

(Continued)

FOREIGN PATENT DOCUMENTS

| JP | 2011-29849 A | 2/2011 |
|---|---|---|
| KR | 10-2011-0018262 A | 2/2011 |

OTHER PUBLICATIONS

Wu et al, Textfinder: An Automatic System to Detect and Recognize Text in Images, Nov. 1999, pp. 1224-1229.*

(Continued)

*Primary Examiner* — Phu K Nguyen
(74) *Attorney, Agent, or Firm* — Sughrue Mion, PLLC

(57) ABSTRACT

An image processing apparatus and a method of processing an image are provided. The image processing apparatus includes a depth estimation unit for estimating a depth of an input three-dimensional (3D) image; a text area detection unit for detecting a text area included in the 3D image; a mask generation unit for generating a text mask for the text area; and a depth correction unit for correcting a depth of the text area based on the estimated depth of the input 3D image and the text mask.

14 Claims, 9 Drawing Sheets

(56) References Cited

U.S. PATENT DOCUMENTS

| | | |
|---|---|---|
| 8,385,630 B2* | 2/2013 | Sizintsev et al. ............. 382/154 |
| 8,570,343 B2* | 10/2013 | Halstead ...................... 345/630 |
| 2010/0157025 A1 | 6/2010 | Suh et al. |
| 2011/0018966 A1 | 1/2011 | Kitazato |
| 2011/0037833 A1 | 2/2011 | Lee et al. |
| 2011/0149036 A1 | 6/2011 | Suh et al. |
| 2012/0133748 A1 | 5/2012 | Cung et al. |

OTHER PUBLICATIONS

Kim, et al., "Stereoscopic Free-viewpoint Tour-Into-Picture Generation from a Single Image", Tour Into Picture, pp. 163-172.

Wu, et al., "TextFinder: An Automatic System to Detect and Recognize Text in Images", IEEE Transactions on Pattern Analysis and Machine Intelligence, vol. 21, No. 11, Nov. 1999, pp. 1-6.

International Search Report issued Jan. 17, 2013 in Application No. PCT/KR2012/007362 (PCT/ISA/210).

* cited by examiner

FIG. 1

GENERAL DATA

GENERAL DATA a)

3D Stereoscopic image. General data is 2D.

*3D Stereoscopic image. General data is 2D.*

IMAGE PROCESSING APPARATUS AND IMAGE PROCESSING METHOD THEREOF

CROSS-REFERENCE TO RELATED APPLICATIONS

This application is a Continuation of PCT Application No. PCT/KR2012/007362, filed Sep. 14, 2012, which claims the benefit of Korean Patent Application No. 10-2012-0091368, filed in the Korean Patent Office on Aug. 21, 2012, and U.S. Provisional Application No. 61/534,533, filed in the United States Patent and Trademark Office on Sep. 14, 2011, the entire disclosures of which are incorporated herein by reference.

BACKGROUND

1. Field

Apparatuses and methods consistent with exemplary embodiments relate to an image processing apparatus and an image processing method thereof, and more particularly, to an image processing apparatus which provides a 3-dimensional image and an image processing method thereof.

2. Description of the Related Art

Recently, development efforts of 3-dimensional (3D) display apparatuses have been accelerated for viewing with more sense of reality. Accordingly, 3D images which were typically watched at the theater can be viewed at home using a display apparatus such as a television.

Meanwhile, in 3D images, overlaid text, such as a movie title or game score, provides a user with added interest. However, it is difficult to calculate a precise disparity for the overlaid text using the existing stereo matching algorithms.

Accordingly, spatial disparity discrepancy results in text distortion and flickers. These problems are magnified in a text area. Therefore, a method for resolving disparity discrepancy in a text area is required.

SUMMARY

One or more exemplary embodiments may meet the above necessity. One or more exemplary embodiments may provide an image processing apparatus capable of correcting the depth of a text area included in a 3D image, and an image processing method thereof.

According to an aspect to an exemplary embodiment, an image processing apparatus includes a depth estimation unit which estimates depth of an input 3D image, a text area detection unit which detects a text area included in the 3D image, a mask generation unit which generates a text mask corresponding to the detected text area, and a depth correction unit which corrects depth of the text area based on the estimated depth and the generated text mask.

The depth correction unit may correct the depth of the text area into a first depth value based on the estimated depth.

The first depth value may be calculated using an equation below:

$$\sum\sum |L(x,y)-R(x-d,y)|\|_{x,y\in T},$$

wherein $L(x,y)$ denotes a left image, $R(x,y)$ denotes a right image, $T$ denotes the text area, and $d$ denotes a depth value.

The depth correction unit may perform depth temporal smoothing for the text area of which depth has been corrected.

The text area detection unit may detect a text line and a text color, and detect the text area based on the detected text line and text color.

The mask generation unit may generate the text mask by expanding a mask using the detected text line and filtering the expanded mask using the detected text color.

The depth estimation unit may generate a depth map based on the estimated depth, and the depth correction unit may correct a depth value corresponding to the text area in the depth map.

According to an aspect of another exemplary apparatus, an image processing method includes estimating depth of an input 3D image, detecting a text area included in the 3D image, generating a text mask corresponding to the detected text area, and correcting depth of the text area based on the estimated depth and the generated text mask.

In the correcting of depth, the depth of the text area may be corrected into a first depth value based on the estimated depth.

The first depth value may be calculated using an equation below:

$$\sum\sum |L(x,y)-R(x-d,y)|\|_{x,y\in T},$$

wherein $L(x,y)$ denotes a left image, $R(x,y)$ denotes a right image, $T$ denotes the text area, and $d$ denotes a depth value.

The method may further include performing depth temporal smoothing for the text area of which depth has been corrected.

In the detecting of the text area, a text line and a text color may be detected, and the text area may be detected based on the detected text line and text color.

In the generating of the text mask, the text mask may be generated by expanding a mask using the detected text line and filtering the expanded mask using the detected text color.

In the estimating of the depth, a depth map may be generated based on the estimated depth, and in the correcting of the depth, a depth value corresponding to the text area in the depth map may be corrected.

Accordingly, according to one or more exemplary embodiments, the convenience of a viewer who views a 3D image may be enhanced.

BRIEF DESCRIPTION OF THE DRAWINGS

The above and/or other exemplary aspects and advantages will be more apparent based on the following description of exemplary embodiments with reference to the accompanying drawings, in which:

FIGS. 1 and 9 illustrate errors in a text area applicable to exemplary embodiments;

DETAILED DESCRIPTION

Figure 2:
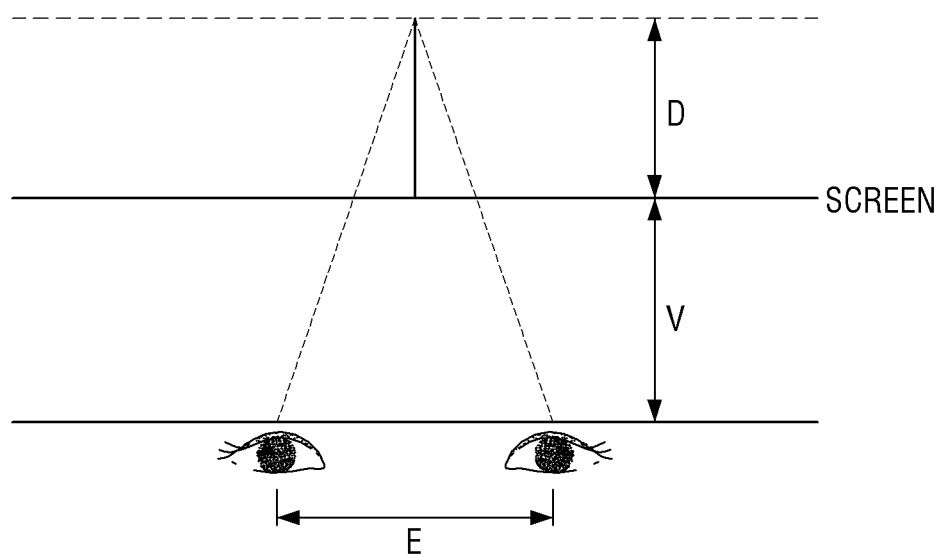
FIG. 2 illustrates disparity of an object seen by both eyes.

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the exemplary embodiments can be carried out without those specifically defined matters. Also, well-known functions or constructions are not described in detail since they would obscure the description with unnecessary detail.

Figure 1:
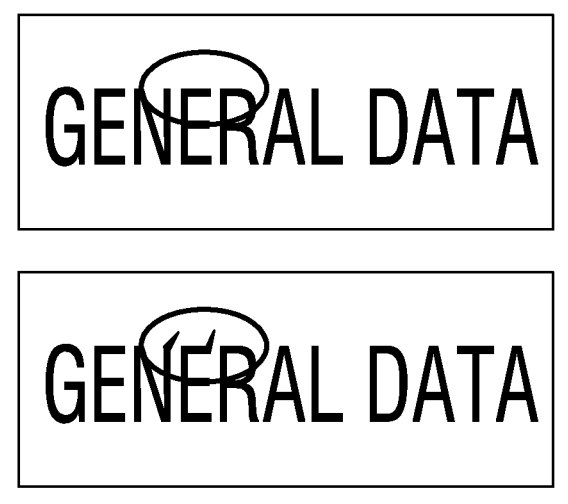

FIGS. 1 and 9 illustrate errors in a text area applicable to exemplary embodiments.

Recently, many electronic devices have supported a stereo video reproduction function. The size of such electronic devices ranges from small mobile phones to large television panels. Unlike 2-dimensional (2D) images, 3-dimensional (3D) stereo content may not be easily scaled suitably for the size of a screen since inappropriate disparity may incur tension and fatigue to eyes. Accordingly, all the 3D stereo contents need to adopt the existing display size and viewing distance in order to prevent inconvenience of the viewer.

In general, disparity may be adjusted by stereoscopic warping. In this case, a depth map is estimated by detecting a corresponding portion between a left image and a right image. The same approach is applied to interpolation of views of an autostereoscopic display. All the middle views may be synchronized from the existing leftmost and rightmost views and corresponding depth map.

Images having a periodic pattern and thin front view objects may become a common error source with respect to stereo matching algorithms. A disparity estimation error may cause serious visual defect after stereoscopic warping.

Object distortion and flickers stand out in salient areas such as, in particular, human faces, text, and logos.

In particular, since overlaid text is positioned adjacent to stroke of a periodic pattern and a letter which have a different depth from a background image, the overlaid text is one of the most difficult portions in a stereoscopic image for stereo matching.

In general, imprecise and/or discordant depth estimation of a text area causes distortion and flickers. Such defects may make the viewers dizzy and distracted, and make the text unreadable in some cases.

FIG. 1 illustrates flickers occurring in a text area of a 3D image.

Accordingly, one or more exemplary embodiments provide a method for reducing flickers and distortion occurring in a text area of a 3D image.

FIG. 2 illustrates disparity of an object seen by both eyes.

In FIG. 2, 'V' denotes the distance between a 3D display and a viewer, 'D' denotes the distance by which an object virtually protrudes or retreats from a screen, and 'E' denotes the distance between both eyes of the viewer. Disparity of the object viewed by both eyes may be expressed in the following equation.

$$\text{Disparity} = \frac{D * E}{D + V} \quad \text{Equation 1}$$

According to Equation 1, in a virtual 3D image, in order to view an object retreated by a distance of D, viewpoints viewed by both eyes is required to be shifted by the disparity. Based on this feature, the 3D display generates a virtual right image and a virtual left image which are separated from each other by the disparity so that the viewer may feel cubic effect.

Figure 3:
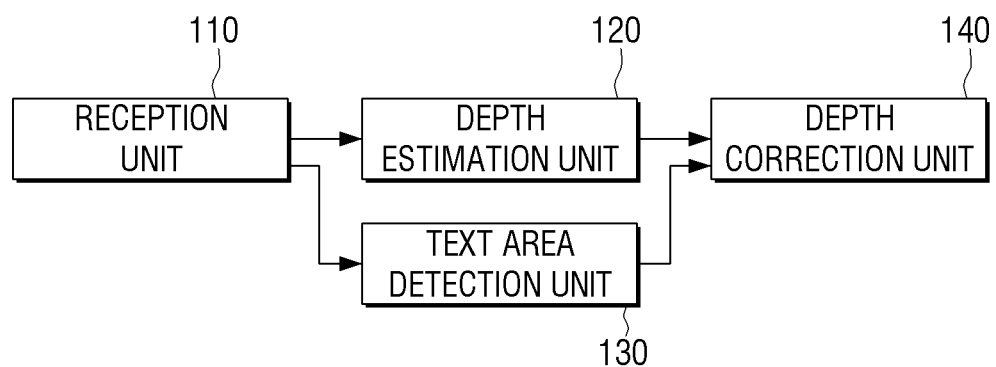
FIG. 3 is a block diagram of a configuration of an image processing apparatus according to an exemplary embodiment.

FIG. 3 is a block diagram of a configuration of an image processing apparatus according to an exemplary embodiment.

As shown in FIG. 3, the image processing apparatus 100 includes a reception unit 110, a depth estimation unit 120, a text area detection unit 130, and a depth correction unit 140.

The reception unit 110 receives a 3D image signal.

Here, a 3D image may be a stereo image. A stereo image includes two images, i.e. a left image and a right image, which are obtained by taking photographs of an object at different angles. The stereo image may be provided from diverse sources. For example, the reception unit 110 may receive a stereo image from a source, such as a broadcasting channel, by cable or wirelessly. In this case, the reception unit 110 may include diverse components such as a tuner, a demodulator, and an equalizer.

In addition, the reception unit 110 may receive a stereo image reproduced by a recording medium reproduction unit which reproduces diverse recording media such as a digital versatile disk (DVD), a Blue-ray disk, and a memory card, or may directly receive a stereo image photographed by a camera. In this case, the reception unit 110 may include diverse interfaces such as a universal serial bus (USB) interface.

In addition, the reception unit 110 may receive a stereo image from an external server such as a web server.

In addition, the 3D image may be an image generated based on a 2D image according to 2D to 3D conversion. Detailed description thereof is omitted here.

The depth estimation unit 120 estimates depth information regarding an object in an image based on a left image and a right image. The depth information indicates 3D distance information of the object in the image, which may be referred to as a depth map or depth image.

For example, the depth information indicates information of cubic effect such as the distance between an object and a camera and the distance between an object and a recording medium forming an image of the object. That is, as the difference in distance between corresponding points of the left image and the right image gets larger, the cubic effect gets larger. The depth map constitutes such changes in depth on a single image, which may be expressed in a grey level which may vary according to the size of a distance between matching points of the left image and the right image. For example, in the depth map, a bright portion has large cubic effect, whereas a dark portion has small cubic effect.

More specifically, the depth estimation unit 120 represents 3D distance information by expressing a depth value varying from 0 to 255 for each pixel constituting the image. For example, on the basis of black and white, black (a low value) may indicate far from the viewer and white (a high value) may indicate close to the viewer.

Meanwhile, the depth estimation unit 120 may perform a stereo matching operation of finding matching points in the left image and the right image so as to generate the depth map. In this case, stereo matching may be performed by applying an adaptive weight.

For example, since the left image and the right image are images obtained by taking photographs of an object from different viewpoints, an image difference may be caused by the difference in viewpoints. For example, in the left image, an edge of the object and a background may overlap, whereas in the right image, the edge of the object and the background may be slightly separated. Accordingly, on the basis of the object, an adaptive weight may be applied by giving a high weight to pixels having a pixel value within a predetermined range and giving a low weight to pixels having a pixel value exceeding the predetermined range. Accordingly, after applying respective adaptive weights to the left image and the right image, whether to perform matching may be determined according to the result of comparison. If the adaptive weight is used, right corresponding points may be prevented from being determined to have a low correlation so that the accuracy of the matching may be enhanced.

Although not shown in the drawings, the image processing apparatus 100 may further include a down-scaler (not shown) to reduce calculation for generating the depth map. That is, the down-scaler (not shown) down-scales an image received through the reception unit 110 and provides the image to the depth estimation unit 120 so that calculation burden may be lightened.

The text area detection unit 130 detects a text area included in the 3D image. The text area may be an overlaid text area such as a subtitle area, a text area included in an on-screen display (OSD), or a broadcasting station logo area.

The text area detection unit 130 performs text localization of a previously detected text frame. The text frame may be detected by detecting a portion which is located at fixed intervals or a compressed domain portion from an input image.

The text area detection unit 130 performs preprocessing of the detected text frame, such as edge extraction, and extracts a linear portion through a linear extraction process of the preprocessed frame, such as Hough transform, so that an area including text can be extracted.

More specifically, the text area detection unit 130 detects a text line and a text color, and detects a text area based on the detected text line and text color. The text area may be extracted in a quadrangular form, but is not limited thereto.

In order to detect the text area, the text area detection unit 130 may use for example, a text line gathering approach. Here, a line may be detected by density of a fixed vertical edge which is similar to a method disclosed in Wu et al. (V. Wu, R. Manmatha, and E. M. Riseman, "Textfinder: An automatic system to detect and recognize text in images," IEEE Trans. Pattern Anal. Mach. Intell., vol. 21, no. 11, pp. 1224-1229, November 1999.).

Vertical Edge Detection

In order to detect a vertical edge, vertical component '$G_y$' of image 'I' is calculated using the following equation.

$$G_y = \begin{bmatrix} -1 & -2 & -1 \\ 0 & 0 & 0 \\ 1 & 2 & 1 \end{bmatrix} \cdot I. \quad \text{Equation 2}$$

In addition, edge threshold value '$E_\tau$' of current frame 'n' is set as in the following equation.

$$E_T^n = \frac{1}{k+1}(k \cdot E_T^{n-1} + G_{RMS}) \quad \text{Equation 3}$$

Herein, 'k' denotes the number of previous frames which are used for threshold time smoothing.

For stable edge detection, a probabilistic model is used. Edge probability '$E_p(x,y)$' is updated as in the following equation.

$$E_p^n(x, y) = \begin{cases} \frac{1}{k+1}(k \cdot E_p^{n-1} + 1), & G_y \geq E_T^n \\ \frac{k}{k+1} E_p^{n-1}, & G_y < E_T^n \end{cases} \quad \text{Equation 4}$$

A pixel of which an edge probability is higher than 0.5 is counted as an edge pixel of a current frame.

Text Line Detection

Edge density '$E_D$' of each horizontal line is calculated. Function '$E_D(y)$' is processed using a median filter.

For a text line, the same probabilistic model as in the vertical edge is used.

A line threshold value is defined as RMS of $E_D(y)$. Consecutive image lines of which line probability '$L_p$' is higher than 0.5 are combined to form a text line, and finally, text lines are filtered according to the minimum and maximum line heights.

Text Color Detection

In order to detect a text color, an input image color quantization is applied, and RGB color space is converted into a palette of 256 colors. Color density is calculated in an area of each color 'c' and inside $C_D^{in}(c)$ of a text line which is equivalent to outside $C_D^{out}(c)$ of the text line. Herein, 'c' may become a color of color text.

According to another exemplary embodiment, the depth of text may be corrected by extracting the text included in a text area. In this case, the text may be extracted by performing morphology operation or area-based processing with respect to the text area.

The depth correction unit 140 corrects the depth of the text area based on the estimated depth and the generated text mask.

More specifically, the depth correction unit 140 may correct the depth of the text area into a uniform first depth value based on the estimated depth and the generated text mask. That is, the uniform depth value may be given so that the depth of each portion of the text displayed within the text area is displayed at the same depth.

In this case, the depth correction unit 140 may uniformly set the depth of the text area to a maximum value from among the depth values of the text area estimated by the depth estimation unit 120.

In addition, the depth correction unit 140 may consider a depth value of an adjacent area according to circumstances. That is, in order that the text area is not displayed differently or discontinuously with respect to an adjacent background image, the depth of the text area may be set to be a value which is similar to a depth value of the adjacent background image. That is, from among the estimated depth values of the text area, the depth of the text area may be set to a value which is most similar to the depth value of the background image.

In addition, the depth correction unit 140 may perform depth temporal smoothing so as to reduce flickers in the depth-corrected text area.

The depth correction unit 140 is described in greater detail with reference to FIG. 4.

Although not shown in the drawings, the image processing apparatus 100 may further include an image processing unit (not shown), a 3D image generation unit (not shown), and a display unit (not shown).

The image processing unit (not shown) crops and overlaps the corrected left and right images based on the corrected depth map of the text area, thereby generating a 3D image.

The 3D image generation unit (not shown) crops the left image and the right image in the corresponding size and generates a 3D image. The 3D image may be a single 3D image file generated by overlapping the cropped left and right images, or may be files in which the cropped left and right images are respectively stored.

The display unit (not shown) displays a 3D image using the data output from the 3D image generation unit (not shown). In other words, when the 3D image generation unit (not shown) overlaps the cropped left and right images and generates a single 3D image, the display unit (not shown) may directly display the 3D image, or when the 3D image generation unit (not shown) outputs the cropped left and right images individually, the display unit (not shown) may overlap and output the output two images in a 3D image form.

For example, the display unit (not shown) spatially divides and outputs a 3D image so that the viewer may feel a sense of distance from the object without wearing glasses and may perceive the 3D image accordingly. In this case, the display unit (not shown) may be implemented with a display panel according to parallax barrier technique or a lenticular technique. Alternatively, the display unit (not shown) may output the left image and the right image alternately so that the viewer may perceive a 3D effect. That is, the image processing apparatus may be implemented in conjunction with either a glassesless system or a glasses-based system.

In the above exemplary embodiment, the depth of the text area is corrected based on the left image and the right image, but this is merely exemplary. According to another exemplary embodiment, after a text area in a 2D image is detected, a depth value of the text area may be uniformly allocated and then a left image and a right image may be generated.

Figure 4:
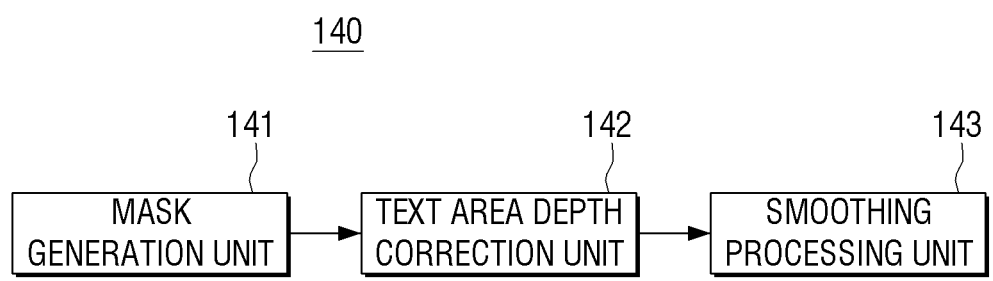
FIG. 4 is a detailed block diagram of a configuration of a depth correction unit according to an exemplary embodiment.

FIG. 4 is a detailed block diagram of a configuration of the depth correction unit according to an exemplary embodiment of the present invention.

As shown in FIG. 4, the depth correction unit 140 includes a mask generation unit 141 and a text area depth correction unit 142.

The mask generation unit 141 may generate a mask corresponding to a text area by expanding a mask using a text line detected by the text area detection unit 130 and filtering the expanded mask using a detected text color.

Figure 5:
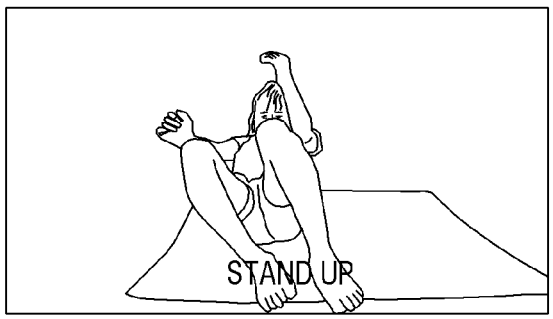
FIG. 5 illustrates a method for generating a text mask according to an exemplary embodiment.
Figure 5:
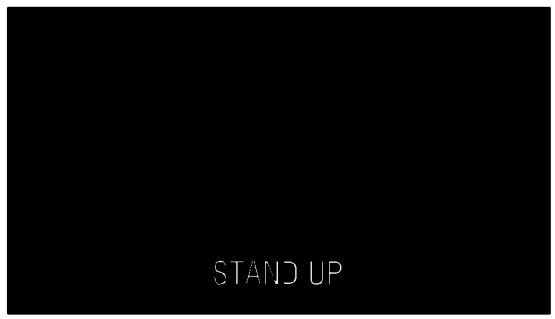

FIG. 5 illustrates a method for generating a text mask according to an exemplary embodiment of the present invention.

In an input image having overlaid text as shown in FIG. 5(a), a text mask corresponding to a text area including the overlaid text is generated as shown in FIG. 5(b) so that the depth of the text area can be corrected.

The text mask is generated by the following repeating process.

1. Expand a vertical edge mask
2. Filter the mask using text color

The repeating process is finished when the text mask in an inside of a text line is stable. For stable result, the same probabilistic model may be applied to the text mask as described above.

The text area depth correction unit 142 may set the depth of the text area to a uniform value using the mask generated by the mask generation unit 141.

The text area depth correction unit 142 may uniformly set the depth of the text area to a maximum value from among the calculated depth values of the text area as described above, or may set the depth using diverse methods described below according to circumstances.

For example, the depth value of the text area may be set to a default value including '0', a highest depth value from among the objects included in a background image, a depth value which is a predetermined value higher than an average value of the objects included in the background image, a depth value of the center of the text area, a depth value of the boundary of the text area, or a value input by the user.

In addition, when there are a plurality of text areas in a single frame, the depth values of the text areas may be set to different depth values or the same depth value.

More specifically, if the entire image areas have the same depth value, a minimum value of the sum of absolute difference (SAD) method may be searched and found. In this case, stereo matching for the entire text area may provide far better result than window-based stereo matching.

If a left image L(x,y), a right image R(x,y) and a corresponding binary text mask T(x,y) are given, the depth value 'd' of the text is corrected and minimized as below.

$$\sum\sum |L(x,y) - R(x-d,y)|\|_{x,y \in T} \qquad \text{Equation 5}$$

Figure 6:
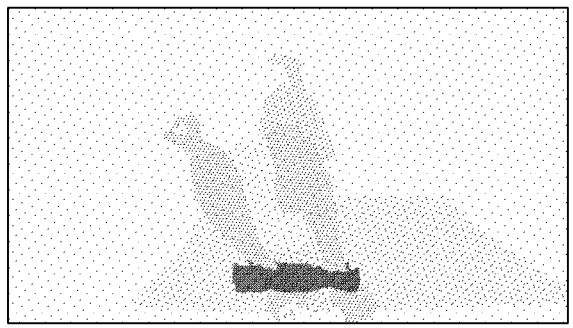
FIG. 6 illustrates another method for generating a text mask according to an exemplary embodiment.
Figure 6:
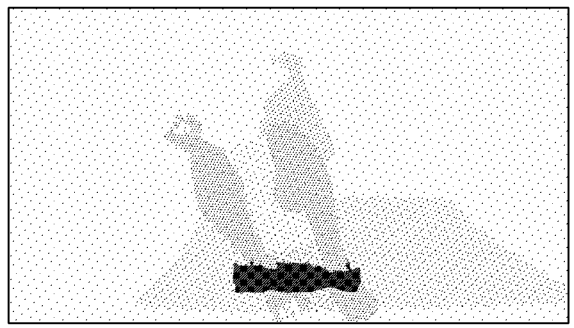

If corrected depth value 'd' is detected for each text area, all of the text pixels may be overlaid with a predetermined depth value (FIG. 6a). Consequently, a depth map may be illustrated as shown in FIG. 6b.

If a text mask is ideal and all of the text pixels have the same depth, the minimum SAD value is small and close to 0. In other words, if the minimum SAD value is relatively large, the text mask may be inappropriate or the text may have different depth values. In both cases, depth correction may cause additional errors and thus may not be desirable. This test may guarantee that depth correction is secure.

The smoothing processing unit 143 may perform depth temporal smoothing for the text area of which depth value has been corrected.

The smoothing processing unit 143 may smooth irregular depth values in the corrected text area so as to remove text flickers caused by a change in depth, or may perform smoothing so as to resolve distortion at the boundary of the text area, which is caused by difference between the corrected depth value and the depth value of the background image.

The smoothing processing unit 143 may perform smoothing for the corrected text area using a smoothing filter such as a median filter, a weighted average filter, and a maximum filter.

The following equation represents an example of smoothing.

$$D'_n(x, y) = \begin{cases} \omega \cdot d + (1 - \omega) \cdot D_{n-1}(x, y), & x, y \in T \\ D_n(x, y), & x, y \notin T \end{cases} \qquad \text{Equation 6}$$

Herein, $\omega \in (0,1)$.

Figure 7:
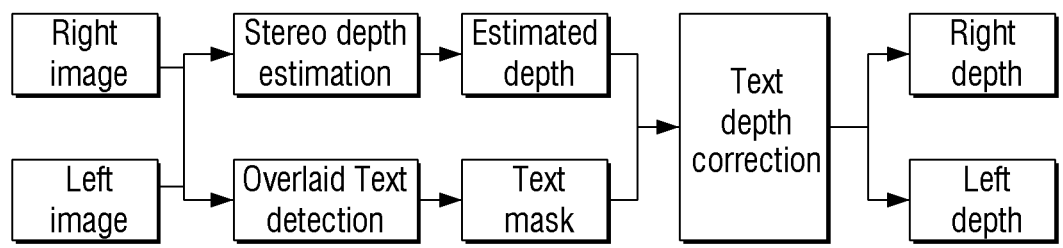
FIG. 7 is a block diagram illustrating an algorithm according to an exemplary embodiment.

FIG. 7 is a block diagram illustrating an algorithm according to an exemplary embodiment.

As shown in FIG. 7, when a left image and a right image are input, a stereo depth is estimated and a depth map is generated.

In addition, an overlaid text area is detected from the input left and right images.

Subsequently, a text mask corresponding to the detected overlaid text area is generated.

Subsequently, the depth of the text area is corrected based on the estimated depth and the generated text mask so that the depth map can be corrected.

The corrected depth map may be used for diverse functions such as depth adjustment of the 3D image.

Figure 8:
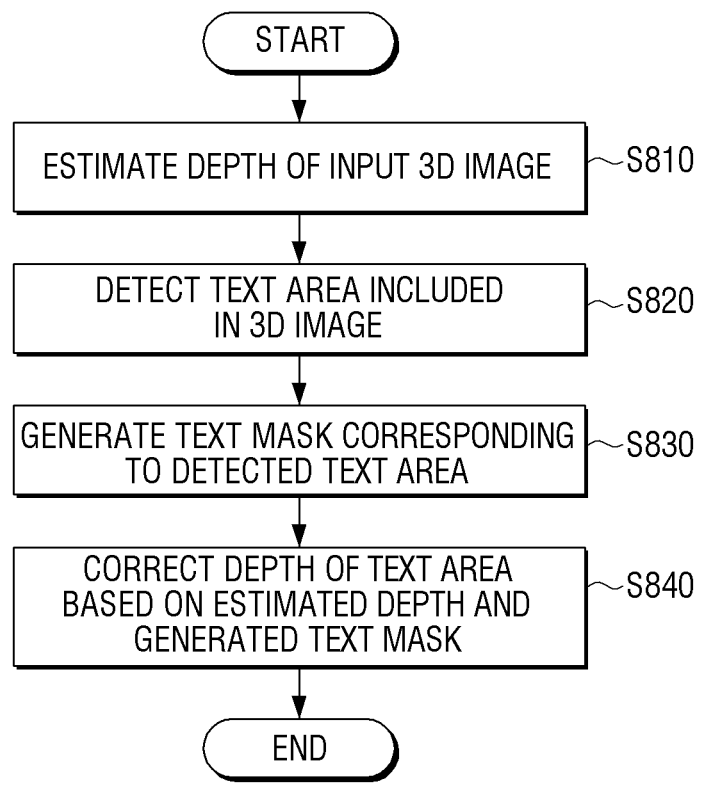
FIG. 8 is a flow chart illustrating an image processing method according to an exemplary embodiment.

FIG. 8 is a flow chart illustrating an image processing method according to an exemplary embodiment.

According to the image processing method shown in FIG. 8, the depth of an input 3D image is estimated (S810).

Subsequently, a text area included in the 3D image is detected (S820).

A text mask corresponding to the detected text area is generated (S830).

The depth of the text area is corrected based on the estimated depth and the generated text mask (S840).

In operation S840 of correcting the depth of the text area, the depth of the text area may be corrected to be a first depth value based on the depth estimated in operation S810.

In this case, the first depth value may be calculated using Equation 6 as described above.

In addition, depth temporal smoothing may be performed for the text area for which depth has been corrected to be the first depth value.

In addition, in operation S820 of detecting the text area, a text line and a text color may be detected, and the text area may be detected based on the detected text line and text color.

In addition, in operation S830 of generating the text mask, a mask is expanded using the detected text line and the expanded mask is filtered using the detected text color so that the text mask may be generated.

In addition, in operation S810 of estimating the depth, a depth map may be generated based on the estimated depth. In this case, in operation S840 of correcting the depth, a depth value corresponding to the text area in the generated depth map may be corrected.

As a result, distortion and flickers caused in the text area of the 3D image may be reduced.

Exemplary embodiments described herein may also be applied in a like manner even when a multi-view image is generated based on 2D images and depth information.

A control method of a display apparatus or a control method of a glass apparatus according to the above diverse exemplary embodiments may be generated as software stored on a computer-readable medium and may be installed in an image processing apparatus.

More specifically, according to an exemplary embodiment, a non-transitory computer readable medium may be provided, on which a program is stored which performs operations including estimating the depth of an input 3D image, detecting a text area included in the 3D image, generating a text mask corresponding to the detected text area, and correcting the depth of the text area based on the estimated depth and the generated text mask may be installed in an image processing apparatus.

A non-transitory computer readable medium is a medium which stores data semi-permanently and is readable by devices. More specifically, the aforementioned diverse applications or programs may be stored and provided in a non-transitory computer readable medium such as a compact disk (CD), digital video disk (DVD), hard disk, Blue-ray disk, universal serial bus (USB), memory card, and read-only memory (ROM).

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An image processing apparatus comprising:
 a computer processor comprising:
  a depth estimation unit which estimates depth of an input three dimensional (3D) image;
  a text area detection unit which detects a text area included in the 3D image;
  a mask generation unit which generates a text mask corresponding to the detected text area; and
  a depth correction unit which corrects a depth of the text area to be a first depth value based on the estimated depth of the input 3D image and the generated text mask.

2. The image processing apparatus as claimed in claim 1, wherein the first depth value is calculated using an equation below:

$$\sum\sum |L(x,y)-R(x-d,y)|_{x,y \in T},$$

wherein L(x,y) denotes a left image, R(x,y) denotes a right image, T denotes the text area, and d denotes a depth value.

3. The image processing apparatus as claimed in claim 1, wherein the depth correction unit performs depth temporal smoothing for the text area of which the depth has been corrected.

4. The image processing apparatus as claimed in claim 1, wherein the text area detection unit detects a text line and a text color, and detects the text area based on the detected text line and text color.

5. The image processing apparatus as claimed in claim 4, wherein the mask generation unit generates the text mask by expanding a mask using the detected text line and filtering the expanded mask using the detected text color.

6. The image processing apparatus as claimed in claim 1, wherein the depth estimation unit generates a depth map based on the estimated depth of the input 3D image, and
 the depth correction unit corrects the depth of the text area in the depth map.

7. An image processing method comprising a computer processor performing operations of:
 estimating depth of an input three dimensional (3D) image;
 detecting a text area included in the 3D image;
 generating a text mask corresponding to the detected text area; and
 correcting depth of the text area to be a first depth value based on the estimated depth of the input 3D image and the generated text mask.

8. The method as claimed in claim 7, wherein the first depth value is calculated using an equation below:

$$\sum\sum |L(x,y)-R(x-d,y)|_{x,y \in T},$$

wherein L(x,y) denotes a left image, R(x,y) denotes a right image, T denotes the text area, and d denotes a depth value.

9. The method as claimed in claim 7, further comprising:
 performing depth temporal smoothing for the text area of which the depth has been corrected.

10. The method as claimed in claim 7, wherein in the detecting of the text area, a text line and a text color are detected, and the text area is detected based on the detected text line and text color.

11. The method as claimed in claim 10, wherein in the generating of the text mask, the text mask is generated by expanding a mask using the detected text line and filtering the expanded mask using the detected text color.

12. The method as claimed in claim 7, wherein in the estimating of the depth, a depth map is generated based on the estimated depth of the input 3D image, and
 in the correcting of the depth, the depth of the text area in the depth map is corrected.

13. A method of processing an image, the method comprising a computer processor performing operations of:
 generating a depth map of a 3D image;
 detecting a text area included in the 3D image;

creating a text mask based on the text area;
correcting a depth of the text area based on the depth map and the text mask, such that a depth of each of a plurality of portion of the text area is corrected to be the same depth.

14. A non-transitory computer-readable medium storing thereon a program for performing a method of processing an image, the method comprising:
generating a depth map of a 3D image;
detecting a text area included in the 3D image;
creating a text mask based on the text area;
correcting a depth of the text area based on the depth map and the text mask, such that a depth of each of a plurality of portion of the text area is corrected to be the same depth.

* * * * *